Dec. 26, 1967  M. M. SEELOFF  3,360,178

APPARATUS FOR MAKING METAL RINGS

Original Filed July 2, 1962

INVENTOR.
MELVIN M. SEELOFF

BY *Francis J. Klempay*

ATTORNEY

United States Patent Office 3,360,178
Patented Dec. 26, 1967

3,360,178
APPARATUS FOR MAKING METAL RINGS
Melvin Max Seeloff, Warren, Ohio, assignor to The Taylor-Winfield Corporation, Warren, Ohio, a corporation of Ohio
Original application July 2, 1962, Ser. No. 206,603, now Patent No. 3,241,347, dated Mar. 22, 1966. Divided and this application Mar. 14, 1966, Ser. No. 534,015
4 Claims. (Cl. 228—15)

The present application is a division of my application Ser. No. 206,603, filed July 2, 1962, now Patent No. 3,241,347.

This invention relates to an improved method and to an improved production apparatus utilizing the said improved method for forming metal rings. The cross-section of the metal may be round, square, rectangular (including flat) or irregular section, and the invention is characterized by simplicity and speed of operation of the apparatus required, also by extreme accuracy in maintaining the proper circumferential length of the rings being formed, and by the very accurate controlling of the abutting or overlapping of the ends of the workpiece to obtain the highest quality of various fusion welding methods which may be employed on the formed rings.

The primary object of the invention is, as suggested above, the provision of an improved method and simplified apparatus utilizing the method for accurately manufacturing rings of diverse cross-sectional shape in a rapid and inexpensive manner. A secondary object of the invention is the provision of an improved arrangement for loading the straight stock used into the forming apparatus whereby extreme accuracy and uniformity will be maintained in the final product. A further object of the invention is the provision of a simplified and improved forming method and apparatus for the manufacture of rings which can be very expeditiously coupled with various kinds of fusion welding equipment whereby after the rings are formed by the bending equipment the same are accurately retained and held by the same equipment thru the fusion joining cycle and until the metal has solidified sufficiently to render the rings dimensionally stable.

The above and other objects and advantages of the invention will become apparent upon consideration of the following specification and the accompanying drawing wherein there is disclosed certain preferred embodiments of the invention.

Figure 1:
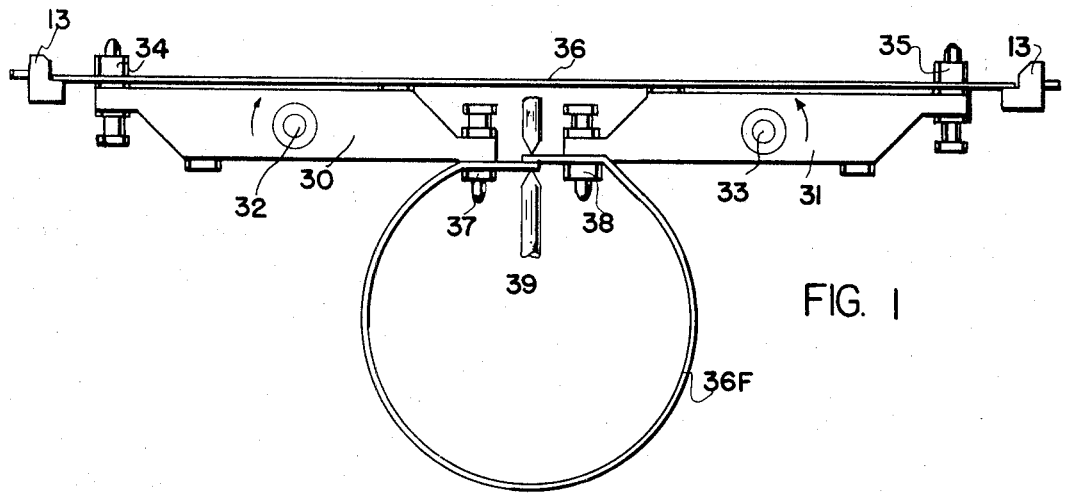

In the drawing:
FIGURE 1 is an elevational schematic view of a ring forming machine constructed in accordance with the principles of my invention; and
FIGURE 2 is a view of the apparatus of FIGURE 1 but showing the parts thereof in another stage of the operational cycle.

Figure 2:
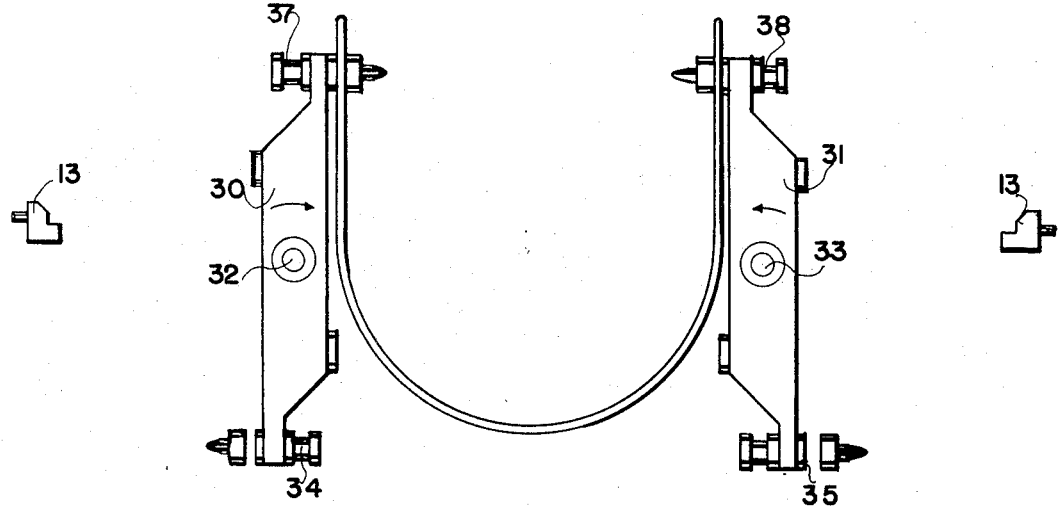

The apparatus of FIGURES 1 and 2 consists essentially of a pair of arms 30 and 31 which are pivoted on spaced parallel axes 32 and 33. Carried by one end of each of the arms 30, 31 is a first set of air operated clamps 34 and 35 which are operative to clamp a first stock length 36 in a horizontal plane, as viewed in FIGURE 1. Also mounted on the arms 30, 31 and lying in the same vertical plane as the clamps 34, 35 but reversely disposed with respect to the clamps 34, 35 and extending outwardly from opposite surfaces of the arms is a second set of air operated clamps 37 and 38. The sets of clamps 34, 35 and 37, 38 may be cantilevered laterally outward from opposite sides of the arms 30, 31 to position the two workpieces in horizontally spaced vertical planes to facilitate the welding operation shown in FIGURE 1.

All of the stock clamps disclosed in FIGURES 1 and 2 are essentially C-shaped so that the stock pieces may be loaded into them by sidewise movement. Again and also, slideable locating gage blocks 13 are employed to slideably support the stock pieces in loading and to center the stock pieces accurately with respect to the axes 32, 33 preparatory to closing of the clamps. Suitable power means, not shown, is employed to swing the arms 30, 31 through 180 degrees as required, and suitable stop means, also not shown, is employed to accurately limit the final at-rest position of these arms. In FIGURE 1, spot welding electrodes, shown schematically at 39, may be employed to weld together the closed ends of the stock pieces after completion of forming.

It should be apparent upon consideration of the above that while a formed ring as shown at 36F, for example, is being welded or stitched together by any of suitable process such as spot, arc or flash welding, the next succeeding stock piece, as shown at 36, may be loaded into the other pair of stock clamps. After the formed ring 36F is joined and the joint processed (flash trimmed or annealed) as desired or permitted the clamps 37, 38 may be released to eject the completed ring and immediately thereafter the arms 30, 31 may be rotated in directions shown by the arrows to form a new ring and to move the clamps 37, 38 to upper positions preparatory to receiving the next succeeding workpiece. The end portions of the workpieces in FIGURES 1 and 2 may be either overlapped as described or be simply abutted or precisely spaced and then joined by other fusion processes than spot welding. Also, it is desirable to synchronize the swinging movement of the arms 30, 31, which may be accomplished by a number of expedients well known in the machine building art.

It should now be apparent that I have provided an improved method and improved and simplified apparatus for carrying out the method which may very rapidly and accurately manufacture rings from precut sections of straight stock of a wide diversity of cross-sectional shapes. Since the stock pieces are continuously held adjacent their ends from loading through joining and subsequent trimming or strength hardening the circumferential dimension of the formed rings remains absolutely accurate and uniform. While some unwanted bending may occur at the clamps subsequent rolling, sizing or other re-forming will restore the rings to desired diameters in an accurate manner since the peripheral dimension never varies. In many cases the peripheral dimension is not as important as the degree of abutment or the amount of overlap of the ends of the workpiece. This is particularly true where the workpieces are not cut to exact length. It is apparent that my invention provides means of locating and clamping the workpieces so that the degree of abutment or the amount of overlap can be consistently and accurately maintained.

A particular advantage of the method and apparatus of the invention is that the absence of mandrels, rolls, etc., greatly simplifies the machinery making it economical to produce and rugged and long lasting in service. Further the lack of any apparatus within the open space of the formed ring permits the use of a wide diversity of joining and subsequent working devices. These devices may be quick acting so that a high rate of production is attainable. Since many changes may be made in the specific apparatus utilized to carry out the principles of my invention without departing from the spirit or scope thereof reference should be had to the appended claims in determining the scope of the invention.

I claim:
1. Apparatus for making rings from straight lengths of bendable workpieces comprising a pair of arms swingably mounted on a spaced pair of parallel axes in such manner that the arms are spaced but longitudinally aligned with respect to each other and swingable from such aligned positions through 180° whereby said arms are inverted, clamps mounted on the top and bottom surfaces of each of said arms symmetrical about the axis of the arm and diagonally related as the arm is viewed in side elevation, the arrangement being such that when said arms are so aligned they collectively mount a spaced pair of clamps on the outer ends of the arms and an adjacent pair of clamps on the inner ends of said arms, and the arrangement being further such that while a formed ring is held in the adjacent pair of clamps a straight workpiece may be inserted in the spaced pair of clamps.

2. Apparatus according to claim 1 further characterized in that the spacing of said axes and the length of the arms are so related to the straight length of the workpiece that after the workpiece is clamped by the spaced pair of clamps and the arms subsequently rotated through 180° the workpiece will be looped into ring form with end portions of the workpiece coming into predetermined relation to one another.

3. Apparatus according to claim 2 further including welding means to weld together the adjacent end portions of said workpiece after the same is bent into ring form.

4. Apparatus according to claim 1 further including gauge stock means to engage the ends of the straight workpieces to thereby accurately control the overhang of the workpieces from each of said spaced clamps.

No references cited.

RICHARD H. EANES, Jr., *Primary Examiner.*